United States Patent [19]

Makishima et al.

[11] Patent Number: 4,794,094
[45] Date of Patent: Dec. 27, 1988

[54] PROCESS FOR PRODUCING AND PRODUCT OF A MACHINABLE CRYSTALLIZED GLASS HAVING NEEDLE-LIKE CRYSTALS PRECIPITATED THEREIN

[75] Inventors: Akio Makishima; Mitsuaki Asami, both of Sakura, Japan

[73] Assignee: National Institute for Research in Inorganic Materials, Ibaraki, Japan

[21] Appl. No.: 14,844

[22] Filed: Feb. 13, 1987

[30] Foreign Application Priority Data

Aug. 11, 1986 [JP] Japan .................................. 61-188300

[51] Int. Cl.$^4$ .............................................. C03C 10/04
[52] U.S. Cl. ........................................ 501/5; 65/17; 65/33; 501/10
[58] Field of Search ............... 501/5, 8, 10; 65/17, 65/33

[56] References Cited

U.S. PATENT DOCUMENTS

| | | | |
|---|---|---|---|
| 3,951,670 | 4/1976 | Bush | 65/33 |
| 3,967,969 | 7/1976 | Busby et al. | 501/10 |
| 4,396,720 | 8/1983 | Beall et al. | 501/5 |
| 4,621,066 | 11/1986 | Nishigaki et al. | 501/8 |
| 4,652,534 | 3/1987 | Kasuga | 65/33 |

OTHER PUBLICATIONS

*Elastic Moduli and Refractive Indices of Aluminosilicate Glasses containing $Y_2O_3$, $La_2O_3$, and $TiO_2$*, "The American Ceramic Society", vol. 61, No. 5–6, May–Jun., 1978, Akio Makishima.

*Synthesis of New Compounds with Apatite Structure*, W. L. Wanmaker et al., "Philips Res. Repts 26", pp. 373–381, 1971.

"Phase Diagrams for Ceramists", pp. 138, 140, 1969 supplement.

*Primary Examiner*—Arthur Kellogg
*Attorney, Agent, or Firm*—Oblon, Fisher, Spivak, McClelland & Maier

[57] ABSTRACT

A process for producing a machinable crystallized glass having needle-like crystals precipitated therein, which comprises melting a mixture comprising from 40 to 60 mol % of $SiO_2$, from 6 to 16 mol % of $Al_2O_3$, from 6 to 16 mol % of $Y_2O_3$ and from 15 to 30 mol % of CaO, and allowing the melt to cool to have fine needle-like crystals of $Ca_4Y_6O(SiO_4)_6$ precipitated.

4 Claims, No Drawings

PROCESS FOR PRODUCING AND PRODUCT OF A MACHINABLE CRYSTALLIZED GLASS HAVING NEEDLE-LIKE CRYSTALS PRECIPITATED THEREIN

BACKGROUND OF THE INVENTION

1. FIELD OF THE INVENTION

The present invention relates to a process for producing a machinable crystallized glass which can be drilled or machined by usual machine tools such as drills or lathes.

2. DESCRIPTION OF THE BACKGROUD ART

Ceramics are useful as various part materials for their excellent properties such as corrosion resistance and heat resistance. However, they have a drawback that they are hardly machinable.

As ceramics which have been made machinable by overcoming this difficulty, (1) a product obtained by precipitating mica in a melt of glass or the like, and (2) a product obtained by fusing and solidifying a mixture of mica and glass powder or other binder, are known. These ceramics utilize the "cleavage" nature of mica crystals.

SUMMARY OF THE PRESENT INVENTION

It is an object of the present invention to provide a new type of machinable crystallized glass having needle-like crystals precipitated therein, wherein no mica crystals are employed.

During a research on a $SiO_2$—$Al_2O_3$—$Y_2O_3$—$CaO$ system glass, the present inventors have found that white cotton-like crystal agglomerates precipitate in glass melted and then solidified, when the glass has a composition within a certain specific range.

Such crystal agglomerates are agglomerates of needle-like crystals having a composition of $Ca_4Y_6O(SiO_4)_6$, and such crystals have a hexagonal prismatic shape having a diameter of from a few micrometers to some ten micrometers having a length of some ten to some hundred micrometers.

Crystalline glass having such needle-like crystals of $Ca_4Y_6O(SiO_4)_6$ precipitated therein, has high hardness and can readily be machined by a drill or by a lathe. The present invention has been accomplished based on this discovery.

The present invention provides a process for producing a machinable crystallized glass having needle-like crystals precipitated therein, which comprises melting a mixture comprising from 40 to 60 mol % of $SiO_2$, from 6 to 16 mol % of $Al_2O_3$, from 6 to 16 mol % of $Y_2O_3$ and from 15 to 30 mol % of $CaO$, and allowing the melt to cool to have fine needle-like crystals of $Ca_4Y_6O(SiO_4)_6$ precipitated.

DETAILED DESCRIPTION OF THE PREFERRED EMBODIMENTS

If $SiO_2$ exceeds 60 mol %, the needle-like crystals of $Ca_4Y_6O(SiO_4)_6$ tend to hardly precipitate although glass is obtainable. On the other hand, if $SiO_2$ is less than 40 mol %, the amount of the fine needle-like crystals tends to be so small that the resulting glass is hardly machinable. Likewise, no precipitation of the fine needle-like crystals will be obtained outside the ranges of from 6 to 16 mol % of $Al_2O_3$, from 6 to 16 mol % of $Y_2O_3$ and from 15 to 30 mol % of $CaO$. Therefore, the proportions of $SiO_2$, $Al_2O_3$, $Y_2O_3$ and $CaO$ in the mixture are required to be within the above-mentioned ranges.

The mixture is melted at a temperatrre of from 1,450° to 1,600° C., and then left to cool, whereby the fine needle-like crystals precipitate.

When the glass thus obtained is subjected to heat treatment at a temperature of from 900° to 1,400° C., a product having a further advanced crystallinity will be obtained. If the heat treatment is conducted at a temperature of lower than 900° C., the crystallization does not proceed. On the other hand, if the temperature exceeds 1,400° C., the crystallization does not proceed, and the product undergoes a deformation. Therefore, the temperature for the heat treatment should be within a range of from 900° to 1,400° C.

Now, the present invention will be described in further detail with reference to Examples. However, it should be understood that the present invention is by no means restricted to there specific Examples.

EXAMPLE 1

A mixture comprising 53.0 mol % of $SiO_2$, 12.0 mol % of $Al_2O_3$, 12.0 mol % of $Y_2O_3$ and 23.0 mol % of $CaO$ was melted at 1,550° C. for 3 hours, and the melt was poured onto a plate and left to cool.

The glass thus obtained, had white crystals precipitated at a crystallinity of about 40%. The crystals were hexagonal prismatic with a diameter of from 8 to 15 μm. The entire glass product was not crystalline. The specific gravity of this glass was 3.20 g/cm$^3$. The thermal expansion was relativlly low with a thermal expansion coefficient of $59 \times 10^{-7}$ l/°C. The glass was highly hard with a Vickers hardness of 652 kg/mm$^2$.

A hole having a diameter of 3 mm was formed by drilling at a speed of 1 mm/min by a carbide-tipped drill (rotational speed of 450 rpm), whereby the drilling was easy. Further, the glass was cut by a lathe with a carbide-tipped cutting tool (rotational speed of 150 rpm) in a cutting depth of 0.5 mm, whereby the cutting was easy.

The crystallized glass obtained as above, was subjected to heat treatment at 1,100° C. for 2 hours. From the X-ray analysis, an increase of the amount of the needle-like crystals of $Ca_4Y_6O(SiO_4)_6$ was confirmed, and precipitation of $CaAl_2Si_2O_8$ (anorthite) was observed in addition to the needle-like crystals. This product was also subjected to the same drilling and cutting operations as described above, whereby both operations were easy.

EXAMPLE 2

A mixture comprising 60.0 mol % of $SiO_2$, 10.0 mol % of $Al_2O_3$, 10.0 mol % of $Y_2O_3$ and 20.0 mol % of $CaO$ was melted at 1,550° C. for 3 hours, and the melt was poured onto a plate and left to cool.

The glass thus obtained was translucent with the interior partially crystallized. The crystals precipitated in the interior were random, and they were crystals of $Ca_4Y_6O(SiO_4)_6$. The glass was subjected to the same drilling and cutting operations as in Example 1, whereby both operations were easy.

This crystallized glass was subjected to heat treatment at 1,200° C. for 3 hours, whereby it turned to white, and it was found that in addition to the crystals of $Ca_4Y_6O(SiO_4)_6$, crystals of $CaAl_2Si_2O_8$ and $Y_2Si_2O_7$ precipitated.

This product had a density of 3.14 g/cm$^3$, a thermal expansion coefficient of $57 \times 10^{-7}$ $1/°C$, and a Vickers hardness of 701 kg/mm$^2$.

This product was subjected to the same drilling and cutting operations as above, whereby both operations were easy.

The crystallized glass obtained by the process of the present invention is readily machinable by virtue of the precipitation of crystals, which is fundamentally different from the conventional drill-processable or machinable crystallized glass, and the hardness is higher by 2 to 3 times the hardness of the conventional machinable crystallized glass, so that it is highly abrasion resistant. Further, it contains no alkali metal oxide, and therefore has excellent electrical insulation properties and heat resistance.

What is claimed is:

1. A process for producing a machinable crystallized glass having needle-like crystals precipitated therein, which comprises melting a mixture comprising from 40 to 60 mol % of $SiO_2$, from 6 to 16 mol % of $Al_2O_3$, from 6 to 16 mol % of $Y_2O_3$ and from 15 to 30 mol % of CaO, and allowing the melt to cool to have fine needle-like crystals of $Ca_4Y_6O(SiO_4)_6$ precipitated.

2. The process for producing a machinable crystallized glass according to claim 1, wherein the crystallized glass having fine needle-like crystals of $Ca_4Y_6O(SiO_4)_6$ precipitated therein is further subjected to heat treatment at a temperature of from 900° to 1400° C.

3. A machinable glass having fine needle-like crystals of $Ca_4Y_6O(SiO_4)_6$ precipitated therein, obtained by melting a mixture comprising from 40 to 60 mol % of $SiO_2$, from 6 to 16 mol % of $Al_2O_3$, from 6 to 60 mol % of $Y_2O_3$ and from 15 to 30 mol % of CaO, and allowing the melt to cool to have fine needle-like crystals of $Ca_4Y_6O(SiO_4)_6$ precipitated.

4. A machinable glass having fine needle-like crystals of $Ca_4Y_6O(SiO_4)_6$ precipitated therein, obtained by further subjecting the crystallized glass having the fine needle-like crystals of $Ca_4Y_6O(SiO_4)_6$ precipitated therein of claim 3 to heat treatment at a temperature of from 900° to 1400° C.

* * * * *